US007839277B2

(12) United States Patent
Hirayama

(10) Patent No.: US 7,839,277 B2
(45) Date of Patent: Nov. 23, 2010

(54) MONITORING SYSTEM AND TEMPERATURE CONTROLLER

(75) Inventor: Hirofumi Hirayama, Tokyo (JP)

(73) Assignee: Yamatake Corporation, Tokyo (JP)

( * ) Notice: Subject to any disclaimer, the term of this patent is extended or adjusted under 35 U.S.C. 154(b) by 342 days.

(21) Appl. No.: 12/179,723

(22) Filed: Jul. 25, 2008

(65) Prior Publication Data
US 2009/0027187 A1 Jan. 29, 2009

(30) Foreign Application Priority Data
Jul. 27, 2007 (JP) ............... 2007-195958

(51) Int. Cl.
*G08B 25/00* (2006.01)
(52) U.S. Cl. .............. 340/525; 340/501; 340/505; 340/518; 340/529; 340/520; 340/635; 236/1 A; 236/1 C; 345/100; 345/618; 345/904
(58) Field of Classification Search .......... 340/525, 340/501, 505, 518, 529, 520, 635; 236/1 A, 236/1 C; 345/100, 618, 904
See application file for complete search history.

(56) References Cited

U.S. PATENT DOCUMENTS
2007/0274104 A1* 11/2007 Furukoshi et al. ............ 363/16

FOREIGN PATENT DOCUMENTS
CN          2255063 Y     5/1997
JP           2004-126732 A   4/2004

* cited by examiner

*Primary Examiner*—Tai T Nguyen
(74) *Attorney, Agent, or Firm*—McDermott Will & Emery LLP

(57) ABSTRACT

The present invention provides A monitoring system comprising a display device, an abnormality detection means for monitoring an object and when detecting an abnormality of the monitored object, outputting an abnormality signal, and a display control means for causing the display device to present an abnormality display, further comprising a latch means for retaining the output state resulting from receipt of an abnormality signal, thereby continuing to output a latch signal until reset, and a reset device for resetting the latch device, wherein the display control device determines in what manner the display device presents an abnormality display, depending on whether an abnormality signal and a latch signal are each transmitted or not.

6 Claims, 5 Drawing Sheets

| PAST / PRESENT | NO LINE FAILURE | LINE FAILUER |
|---|---|---|
| NO LINE FAILURE | PV VALUE GLOWING DISPLAY | ALTERNATING DISPLAY PV VALUE:GLOWING AL01:FLASHING |
| LINE FAILUER | ALTERNATING DISPLAY PV VALUE:GLOWING AL01:GLOWING | ALTERNATING DISPLAY PV VALUE:GLOWING AL01:GLOWING |

MONITORING SYSTEM AND TEMPERATURE CONTROLLER

CROSS-REFERENCE TO RELATED APPLICATION

The present application claims priority under 35 U.S.C. §119 to Japanese Patent Application No. 2007-195958 filed on Jul. 27, 2007. The content of both applications are incorporated herein by reference in their entirety.

BACKGROUND OF THE INVENTION

1. Field of the Invention

This invention relates to a monitoring system incorporated in a temperature controller or the like to monitor an object and present information about the state of the monitored object on a display device incorporated therein.

2. Description of the Related Art

Japanese Patent Application KOKAI Publication 2004-126732 (referred to as Patent Document 1) discloses a temperature controller for controlling temperature of a variety of temperature environments, etc. The temperature controller disclosed has a function of controlling the temperature of an object by obtaining a control output (MV value) to be supplied to a heating•cooling device on the basis of a temperature (PV value) of the object detected by a temperature sensor such as a thermocouple or a resistance thermometer and a set temperature (SP value), while presenting a numerical display of the detected temperature. Generally, the temperature controller of this type has also a function of detecting abnormalities, and when detecting an abnormal temperature of the temperature-controlled object, a failure of the temperature sensor or the like, presents a warning display and supplies event information to the outside to notify the detected abnormal event. The warning display is presented, for example on a display device for presenting a numerical display of temperature.

As an example, that a failure of the temperature sensor to be detected can be a conductor breakage in a sheathed thermocouple. There are cases such that a conductor becomes broken due to thermal stress acting in filling material thereof only when its temperature rises high, and returns to a conductive state when the temperature drops. In such cases, since the conventional temperature controller is configured to present a warning display only when a conductor breakage is detected, there is a risk that the warning display is overlooked so that the conductor breakage in the sheathed thermocouple fails to be recognized, unless the display device is always monitored.

Further, there are temperature controllers arranged such that when a failure of the body of the temperature controller is detected, event information is generated and transmitted to the outside, for example by means of a latch circuit configured to retain the output state resulting from receipt of an abnormality detection signal, thereby continuing to output a latch signal until reset. In such temperature controllers, however, the failure cannot be recognized unless event information supplied from the temperature controller to the outside is monitored by means of an external device such as a main control device. Further, even when the failure of the body of the temperature controller is gone so that outputting of an abnormality detection signal stops, transmission of event information continues unless the latch circuit retaining the output state resulting from the receipt of an abnormality detection signal is reset. This prevents an accurate grasp of the present situation.

SUMMARY OF THE INVENTION

The present invention has been made to solve the problems as mentioned above. The primary object thereof is to provide a monitoring system simple in structure and allowing, for example, a failure of the body or a temperature sensor of a temperature controller, an abnormal state of a temperature-controlled object, etc. to be visually recognized (grasped) easily on a display device incorporated therein, and a temperature controller incorporating such monitoring system.

In order to achieve the above object, the present invention provides a monitoring system comprising a display device, an abnormality detection means for monitoring an object and when detecting an abnormality of the monitored object, outputting an abnormality signal, and a display control means for causing the display device to present an abnormality display, wherein the monitoring system further comprises a latch means for retaining the output state resulting from receipt of an abnormality signal, thereby continuing to output a latch signal until reset, and a reset means for resetting the latch means, and the display control means determines in what manner the display device presents an abnormality display, depending on whether an abnormality signal and a latch signal are each transmitted or not.

In this monitoring system, the display device presents an abnormality display in the manner that varies depending on whether an abnormality signal and a latch signal are each transmitted or not, thereby notifying occurrence of an abnormality, precisely, simply and effectively.

In a preferred aspect, the display control means can cause the display device to present an abnormality display in the manner that varies depending on whether an abnormality signal is transmitted, or an abnormality signal is not transmitted but a latch signal is transmitted.

In this aspect, the varying manner of the display device's presenting an abnormality display allows precise recognition of whether an abnormality previously detected still continues or an abnormality has just occurred or an abnormality previously detected is gone.

In a preferred aspect, the monitoring system further comprises a setting means for setting, in advance, the manner in which the display device presents an abnormality display, for each of combinations of transmission and non-transmission of abnormality and latch signals.

In this aspect, when an abnormality is detected, an abnormality display is presented in the manner set for the current combination of transmission and non-transmission of abnormality and latch signals. This allows recognition of a wider range of abnormalities.

In a preferred aspect, the monitoring system further comprises a check means for checking the output state of the latch means in response to an instruction supplied from the outside, and the display control means causes the display device to present an abnormality display on the condition that the check means receives an instruction.

In this aspect, it is possible to cause the display device to present an abnormality display as necessary, by supplying an instruction to the check means, in order to know how an abnormality is going.

In the present monitoring system, the abnormality detection means may monitor a temperature sensor, and when detecting a transmission-line failure in the temperature sensor, output an abnormality signal.

In this case, the varying manner of the display device's presenting an abnormality display allows precise recognition of whether a transmission-line failure in the temperature sensor previously detected still continues or a transmission-line failure has just occurred or a transmission-line failure previously detected is gone.

The present invention also provides a temperature controller comprising a monitoring system of the structure described above, a temperature sensor, and a temperature control means for controlling temperature of an object on the basis of a temperature signal transmitted from the temperature sensor.

This temperature controller likewise allows precise recognition of whether an transmission-line failure in the temperature sensor previously detected still continues or a transmission-line failure has just occurred or a transmission-line failure previously detected is gone, thereby providing an effective assistance in dealing with transmission-line failures in the temperature controller.

Further scope of applicability of the present invention will become apparent from the detailed description given hereinafter. However, it should be understood that the detailed description and specific examples, while indicating preferred embodiments of the invention, are given by way of illustration only, since various changes and modifications within the sprits and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
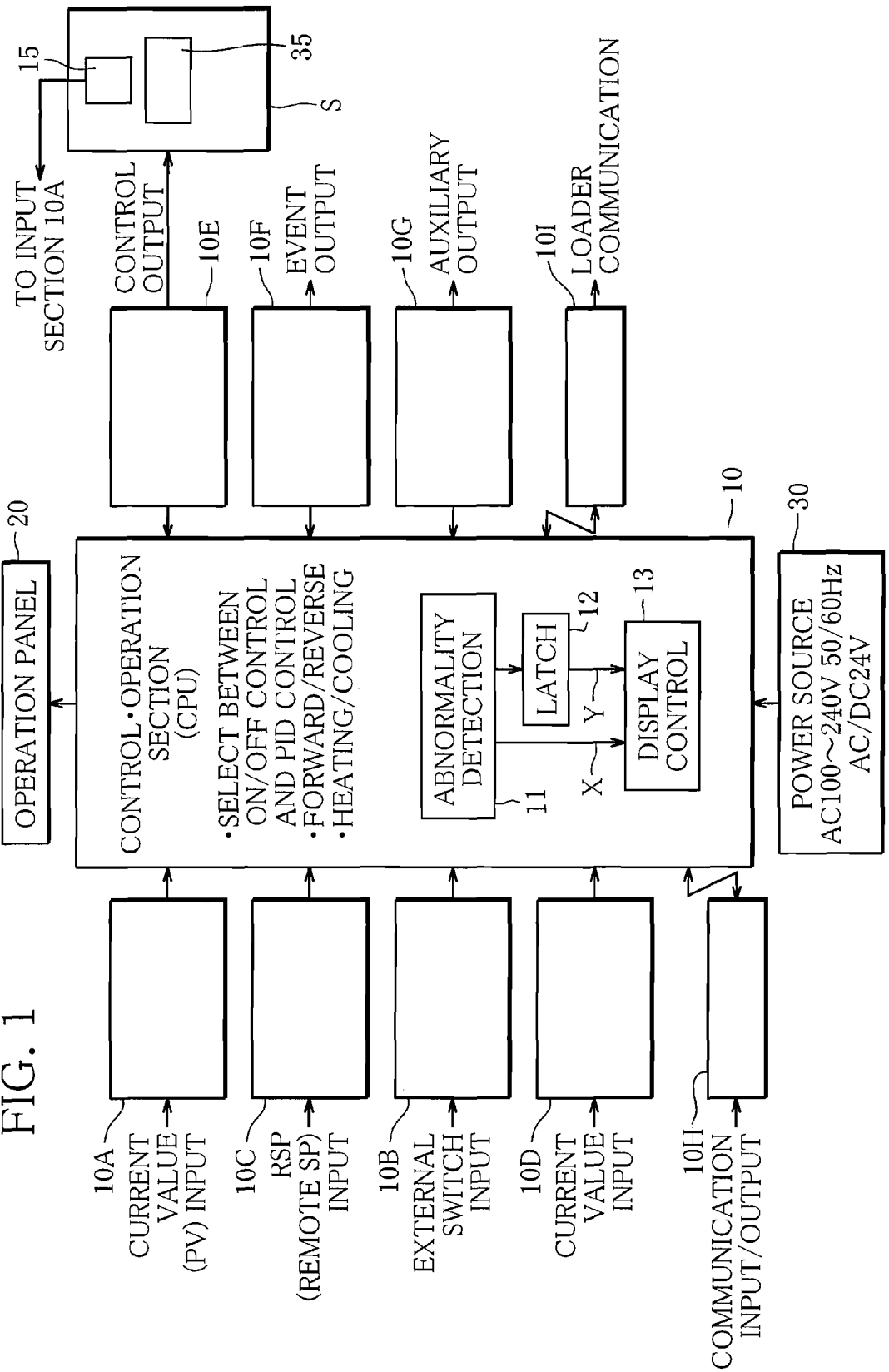
FIG. 1 is a diagram schematically showing the structure of a temperature controller in which a monitoring system according to the present invention is incorporated.

Referring to the drawings attached, as an embodiment of the present invention, a temperature controller incorporating a monitoring system according to the present invention will be described.

FIG. 1 is a functional block diagram schematically showing the structure of a temperature controller according to the present invention. The temperature controller includes a body, whose main component is a control•operation section 10 which is a CPU, an operation panel 20 constituting a man-machine interface for the control•operation section 10, and a power source section 30. A temperature sensor 15 is connected to an input section of the control•operation section 10, and a heating•cooling device 35 is connected to an output section thereof. Thus, the temperature controller controls the temperature of an object S by controlling the operation of the heating•cooling device 35 on the basis of a temperature of the object S detected by the temperature sensor.

Basically, the control•operation section 10 receives a temperature detected by the temperature sensor 15 as a current temperature (PV value), obtains a control value (MV value) according to difference between the PV value and a value preset as a control target (SP value), and supplies the MV value to the heating•cooling device 35, for example under PID control. The control•operation section 10 also monitors PV, difference between PV and SP, MV, etc. and when any of the variables monitored is out of a preset range, generates event information.

Figure 2:
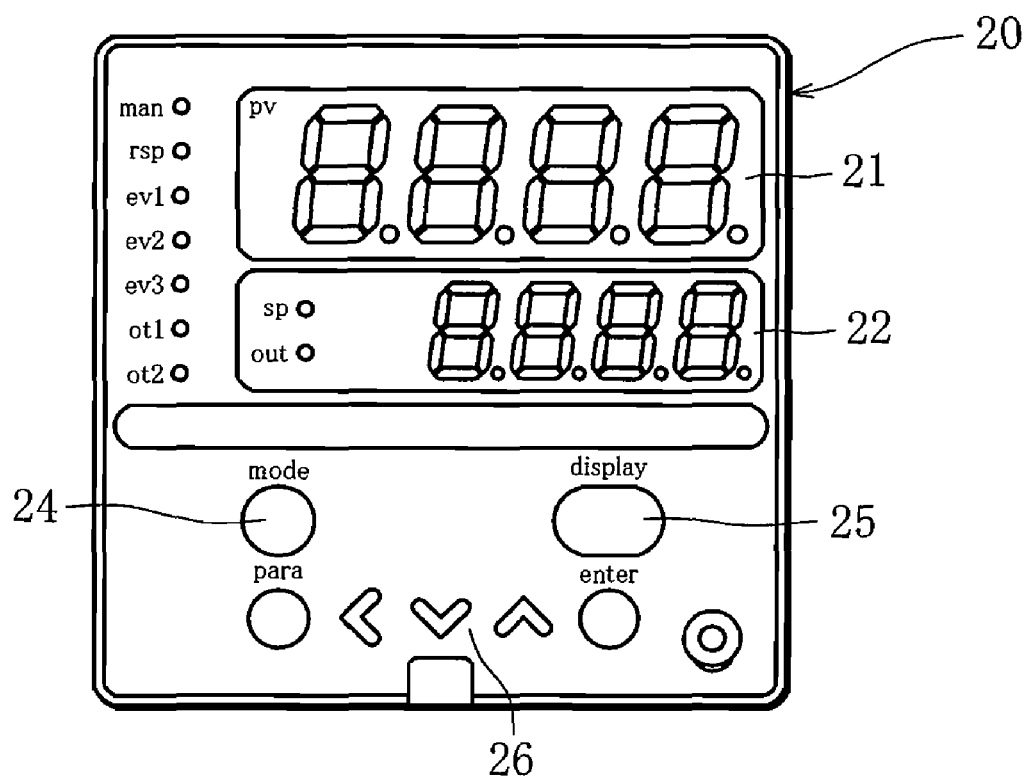
FIG. 2 is a diagram showing an example of an operation panel of the temperature controller shown in FIG. 1.

FIG. 2 schematically shows an example of structure of the operation panel 20. The operation panel 20 shown there comprises a main display device 21 and a sub-display device 22 each capable of presenting numbers made of four digits, a plurality of auxiliary indicators 23 provided to indicate occurrence of a variety of events, etc. and each associated with one event, which will be described later, and a plurality of buttons such as a mode change button 24, a display change button 25 and a cursor button 26. Basically, the main display device 21 presents a detected temperature (PV value) which the temperature controller has received, and the sub-display device 23 presents a set temperature (SP value) or a control output (MV value). The type of information to be presented by the sub-display device 22 can be selectively changed, for example by operating the display change button 25. Further, the set temperature (SP value) presented by the sub-display device 22 can be changed by operating the cursor button 26. By operating the buttons like this, the operating conditions, etc. are set.

Basic functions of the temperature controller configured as described above are set forth in detail in the above-mentioned Patent Document 1, etc., and well known to those skilled in the art from a variety of commercially-available temperature controllers, as basic specifications.

Here, such basic functions will be described only briefly. An input section 10A receives a detection signal from a thermocouple, a resistance thermometer or the like. An input section 10B receives signals for setting values used in control, from a variety of external switches (not shown), a signal for setting the temperature controller to "RUN" state or "READY" state and a signal for setting the temperature controller to "AUTO" mode or "MANUAL" mode. The input section 10B also receives a signal for controlling a latch means (described later). An input section 10C receives remote signals for increasing or decreasing a variety of set values continuously. An input section 10D receives the value of current flowing in the heating•cooling device 35. The above-mentioned input sections process the received signals and pass them on to the control•operation section. The control•operation section 10 perform mathematical operations on the signals from the input sections 10A to 10D, and transmits resultant signals to output sections 10E and 10F. On the basis of those signals, the output section E sends an actual-temperature control signal to the heating•cooling device 35, while the output section 10F sends signals indicating a variety of abnormal states and failures. The output section 10G sends an analog signal corresponding to the above-mentioned detection signal or a signal corresponding to the detection signal in another manner.

In addition to the above-described basic functions, the temperature controller has a communication function for receiving and sending communication signals through an input-output section 10H, a function of transmitting the detection signal to a sequencer (not shown), and a personal-computer loader function for performing loader communications with a personal computer (not shown), etc.

A feature characteristic of the temperature controller (monitoring system) according to the present invention is that the control•operation section 10 includes an abnormality detection means 11 which outputs an abnormality detection signal X when detecting a failure of the body or the temperature sensor of the temperature controller or an abnormal state of the temperature-controlled object whose temperature is detected by the temperature sensor; a latch means 12 which retains the output state resulting from receipt of an abnormality detection signal X, thereby continuing to output a latch signal Y until reset; and an abnormality display control means 13 which causes, for example the main display device 21 to present an abnormality display (warning display) in the manner that varies depending on whether or not an abnormality detection signal X is outputted when a latch signal Y is being outputted from the latch means 12.

Specifically, the abnormality detection means 11 monitors, for example, current flowing in the temperature sensor composed of a sheathed thermocouple to detect a conductor breakage in the temperature sensor (sheathed thermocouple), and when detecting a conductor breakage in the temperature sensor (sheathed thermocouple), outputs an abnormality detection signal X. The latch means retains the output state resulting from receipt of the abnormality detection signal X, thereby continuing to output a latch signal Y until reset, for example by supplying an abnormality reset signal to the control•operation section 10 from the outside.

When receiving a latch signal Y from the latch means 12, the abnormality display control means 13 causes the main display device 21 to present, as an abnormality display (warning display), warning information indicating an abnormal event detected by the abnormality detection means 11, for example an abnormality code [AL01] indicating a conductor breakage in the temperature sensor (sheathed thermocouple), in place of a numeric display indicating the state of the temperature-controlled object, specifically a temperature (PV value) detected by the temperature sensor, which the main display device 21 normally presents. Here, the abnormality display control means 13 causes the display device to present the abnormality code [AL01] in the manner that varies depending on whether an abnormality detection signal X is transmitted or not, thereby notifying whether the abnormality previously detected still continues or is gone.

Figure 3:
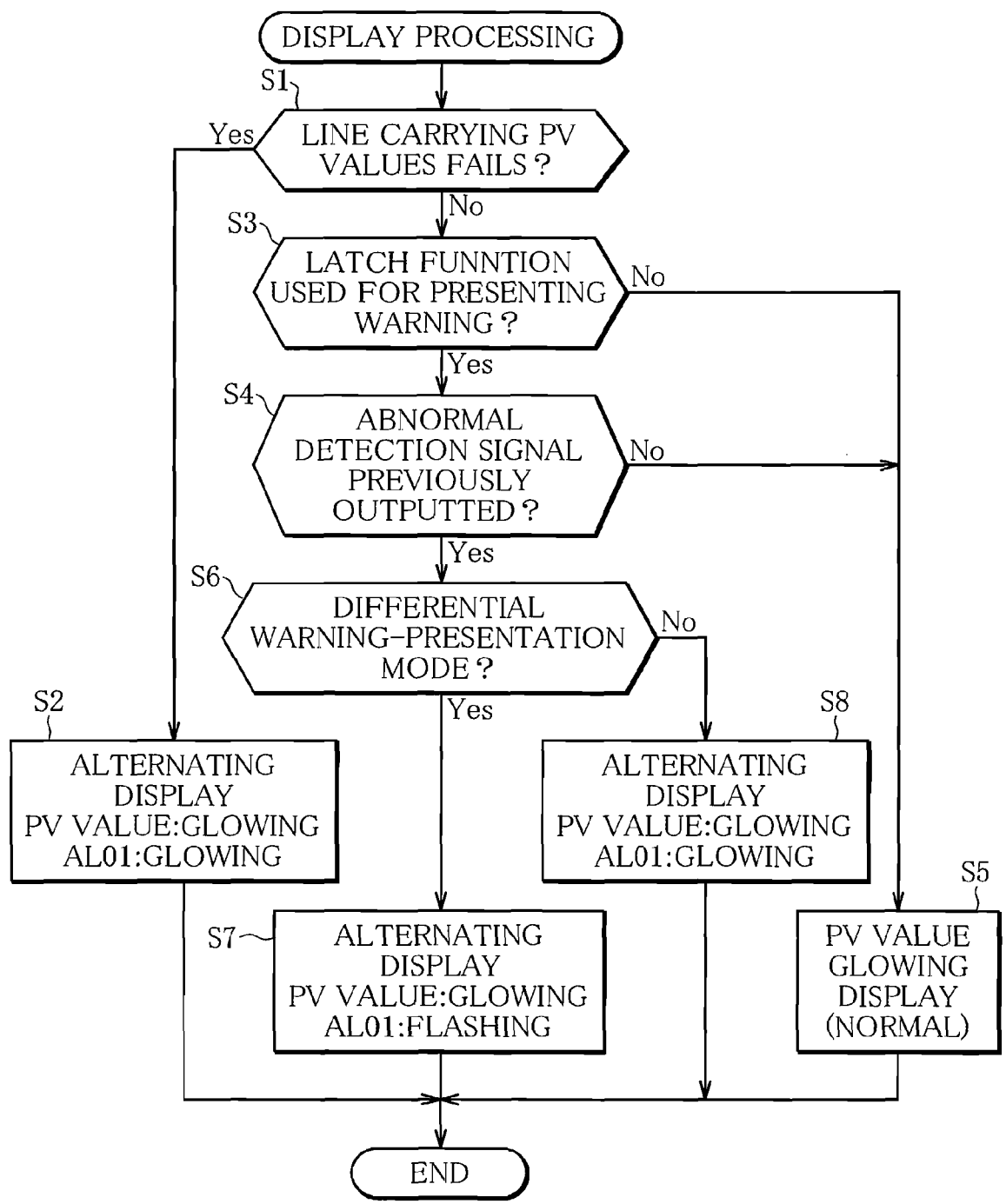
FIG. 3 is a diagram showing an example of an abnormality display control procedure in the temperature controller shown in FIG. 1.
Figures 4, 5:
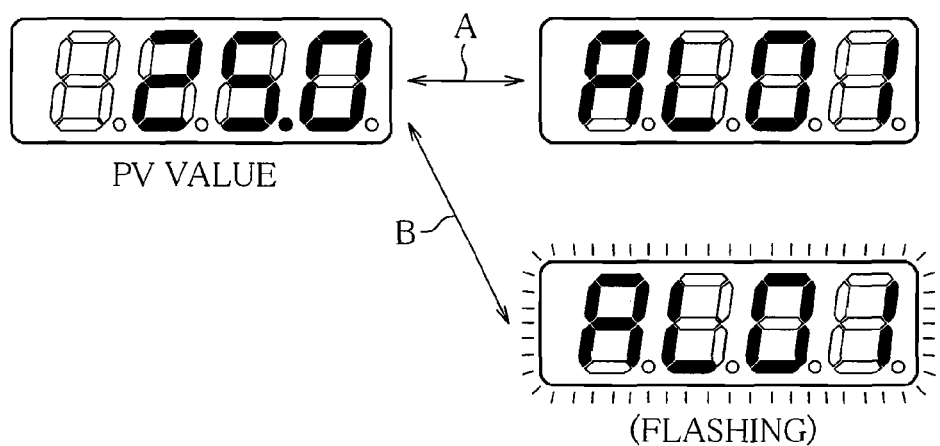
FIG. 4 is a diagram schematically showing how a display device presents an abnormality display.
FIG. 5 is a diagram showing how the display device presents information depending on situation.

More specifically, the abnormality display control means 13 controls how the main display device 21 presents information, according to the process shown in FIG. 3, for example. First, whether the signal line carrying PV values has a failure or not is determined (Step S1). If a failure of the signal line is detected, the main display device 21 is caused to present an alternating display in which, for example, a PV value indicating the latest detected temperature and warning information (abnormality code) indicating a line failure are presented alternately (Step S2). In this alternating display, the PV value and the warning information (abnormality code) alternate at intervals of 1 second, for example, as indicated by arrow A in FIG. 4. Incidentally, FIG. 4 shows an example where a temperature [25.0° C.], which is a PV value, and an abnormality code [AL01] are presented alternately.

If a failure of the signal line carrying PV values is not detected (Step S1), whether the latch function, i.e., the latch means 22's function of retaining the output state resulting from receipt of an abnormality detection signal X, thereby continuing to output a latch signal Y until reset is being used or not is determined (Step S3). If the latch function is being used, whether or not the latch means 22 is in an "ON" state, namely outputting a latch signal Y is determined (Step S4). If the latch function is not being used or a latch signal Y is not being outputted, the main display device 21 continues to present a PV value (Step S5), since a failure of the signal line has not been detected at Step S1, or in other words, no abnormality exists at present.

If, however, the latch function is being used and a latch signal Y is being outputted, it means that a line failure occurred in the past although no line failure exists (is detected) at present. Thus, whether or not an abnormality display is to be presented in the manner that varies depending on how an abnormality has emerged, on the basis of transmission or non-transmission of a latch signal Y, is determined (Step S6). Specifically, whether a display mode using a function of presenting a warning display in the manner that varies depending on how an abnormality has emerged, which function is characteristic of the temperature controller (monitoring system) according to the present invention, has been selected or not is determined.

If the above-mentioned display mode (hereinafter referred to "differential warning-presentation mode") has been selected, the display device is caused to present an alternating display in which a PV value, namely a detected temperature and warning information (abnormality code) indicating a line failure alternate, and in which the warning information (abnormality code) flashes on and off (Step S7). Specifically, in this alternating display, for example, a temperature [25.0° C.], which is a PV value, and an abnormality code [AL01] alternate at intervals of 1 second, and the abnormality code [AL01] flashes at intervals of 0.2 seconds, as indicated by arrow B in FIG. 4. If the differential warning-presentation mode has not been selected, a PV value (detected temperature) and warning information (abnormality code) are presented (caused to glow) alternately, without causing the warning information (abnormality code) to flash on and off (Step S8), as at Step S2.

In other words, the abnormality display control means 13 determines whether or not an abnormality exists at present, from whether or not an abnormality detection signal X is transmitted, and determines whether or not an abnormality occurred in the past, from whether or not a latch signal Y is transmitted, and varies the manner in which the main display device 21 presents information, for example depending on whether a failure of the signal line carrying PV values occurred in the past or not, and whether a failure of the signal line exists at present or not, as shown in FIG. 5. Specifically, if an abnormality does not exist at present and did not occurred in the past, the display device continues to present a PV value (normal display). If no abnormality exists at present but an abnormality occurred in the past, the display device presents a PV value and a flashing abnormality code alternately. If an abnormality exists at present, the display device presents a PV value and a non-flashing abnormality code alternately.

It is possible to provide a check means for checking the output state of the latch means 22 in response to an instruction supplied from the outside, and arrange such that, only when the check means detects a latch signal Y, an abnormality display is presented in the manner that varies depending on how an abnormality has emerged. Specifically, the process shown in FIG. 3 can be modified such that, after the selection of the differential warning-presentation mode is recognized (Step S6), in response to an instruction supplied from the outside, whether a latch signal Y is being outputted or not is determined. Then, according to the result of determination, an abnormality code [AL01] is presented in a glowing manner, a flashing manner or another manner.

In order to cause the main display device 21 to present a warning display, the monitoring system (temperature controller) configured as described above not only monitors abnormality detection signals X which the abnormality detection means 11 outputs, but also latch signals Y which the latch means configured to retain the output state resulting form receipt of an abnormality detection signal X sends to the external sequencer or the like. Even if an abnormality detection signal X is not transmitted, if a latch signal Y is transmitted, the main display device 21 is caused to present a warning display, thereby notifying, in a simple manner, that an abnormality occurred in the past although no abnormality exists at present. Particularly, a warning display is presented in the manner that varies depending on whether or not a latch signal Y is being outputted when an abnormality detection signal is outputted, which allows recognition of how an abnormality has emerged. Further, the monitoring system (temperature controller) can present an abnormality display (warning display) by making effective use of a display device incorporated in the monitoring system (temperature controller), without relying on the external sequencer or the like in determining how an abnormality has emerged. Thus, the monitoring system (temperature controller) provides an enhanced ease of use (handling), etc.

Specifically, as mentioned above, in the sheathed thermocouple, when temperature drops, a conductor breakage (line failure) may apparently recover. In such case, however, the monitoring system (temperature controller) notifies that a conductor breakage (line failure) occurred in the past, which can lead to quick replacement. Thus, the monitoring system (temperature controller) prevents problems such as overlooking of a conductor breakage (line failure) of the sheathed thermocouple and continuous use of the defective sheathed thermocouple. Needless to say, the latch means is reset by external operation after the abnormality is removed, for example by replacement of the sheathed thermocouple.

Figure 6:
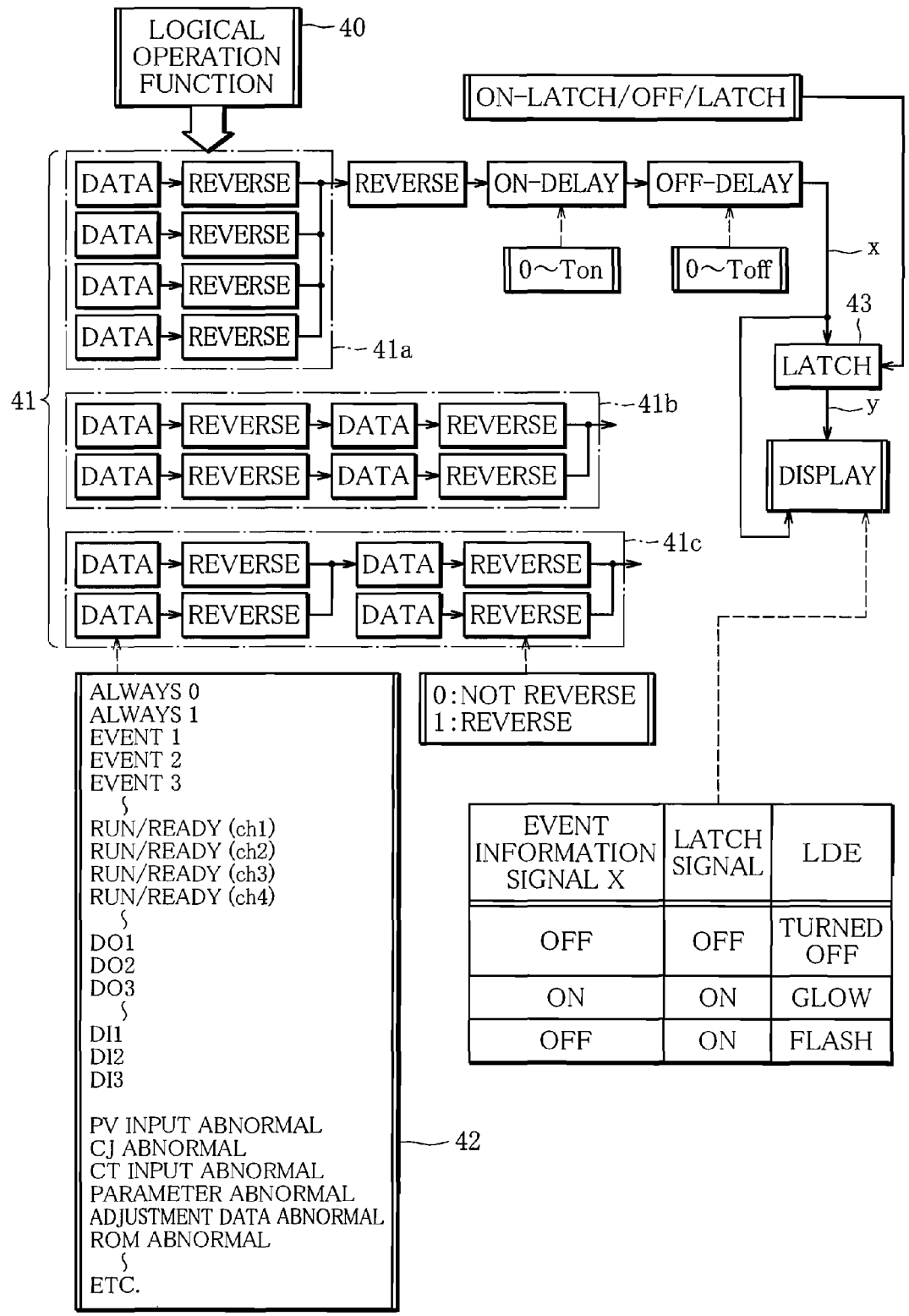
FIG. 6 is an example of an event information setting page.

The monitoring system (temperature controller) has also a function of generating an event information signal, for example depending on the states of a variety of objects which are monitored, and transmitting it to the sequencer, etc. Further, it is arranged such that when an event information signal is outputted, an indicator (light-emitting diode) associated with an event in question, among a plurality of indicators each associated with an event, is driven to glow, thereby notifying occurrence of the event. Such event monitoring function is set, for example by displaying an event setting page as shown in FIG. 6, on a screen of a personal computer by using a dedicated tool installed in the personal computer, then setting conditions for identifying events according to the user's definitions, and then installing the set conditions into the monitoring system (temperature controller) by using a personal-computer loader function.

The event monitoring function is set, for example as follows: Among a plurality of logical operation patterns 41 (41a to 41b) each consisting of a combination of operators [AND] and [OR], which are prepared in advance, one is selected by using a logical operation function 40. Then data items for identifying an object to be monitored are put in the selected logical operation pattern 41 as operands. As shown in FIG. 6, for the present monitoring system (temperature controller), there are prepared three logical operation patterns, namely a logical operation pattern 41a to obtain a logical sum of four operands, a logical operation pattern 41b to obtain two logical products of each two operands and then a logical sum of the resultant two logical products, and a logical operation pattern 41c to obtain a logical sum of two operands, then a local product of the resultant logical sum and another operand, and then a logical sum of the resultant logical product and another operand.

Data items to be put in the logical operation patterns 41 as operands are selected from candidate data items 42 prepared in advance, such as [Event 1] . . . , [RUN/READY] . . . , [DO1] . . . , [DI1] . . . , [PV input abnormal] . . . . For each data item, a reversing function is provided to allow selection of whether to reverse each data value, for use in logical operation according to the operation patterns 41a to 41c. The reversing function is so provided to allow switch between [REVERSE] and [NON-REVERSE] on the screen.

The candidate data items will be explained briefly. [Event 1] to [Event 3] denote information indicating whether or not a specified event occurred previously. [RUN/READY (ch1)] to [RUN/READY (ch3)] denote information indicating whether respective channels are in "USE" state or "READY" state. [DO1] to [DO3] denote control output information transmitted from the output section 10E. [DI1] to [DI3] denote input information transmitted from the input section 10A. [PV input abnormal] denotes information indicating whether or not an input from the temperature sensor is abnormal, [CJ input abnormal] denotes information indicating whether or not terminal temperature is abnormal, and [CT input abnormal] denotes information indicating whether or not the value of current flowing in the heating•cooling 35 is abnormal. [Parameter abnormal] denotes information indicating whether or not any of the values of control parameters used in control by the temperature controller is abnormal, and [Adjustment data abnormal] denotes information indicating whether or not adjustment data used in control by the temperature controller is abnormal.

The result of logical operation according to the set conditions is subjected to on-delay or off-delay processing, according to the user's setting, so that an event information signal x is generated. It may be arranged such that the result of logical operation is reversed before subjected to on-delay or off-delay processing.

An event information signal x thus generated is transmitted to a latch means 43, which retains the output state resulting from the receipt of the event information signal x, thereby continuing to output a latch signal y. This enables the arrangement such that an auxiliary indicator 23 associated to a specified event is caused to glow or flash, depending on whether an event information signal x and an latch signal y are each transmitted or not, thereby notifying occurrence of the specified event. The auxiliary indicators 23 each associated with an event change their state according to table 44 shown in FIG. 6, thereby notifying whether an event occurred in the past or is going on now. Thus, the auxiliary indicators 23 can indicate how an event has emerged, precisely, just as the above-described display device can indicate how an abnormality has emerged, precisely. Incidentally, by using an on-latch/off-latch means 43, the latch means 43 can be set to "active" state or "inactive" state as necessary, and also can be reset.

The present invention is not limited to the above-described embodiment. Although the explanation has been made using an example that the signal line carrying PV values has a failure, the present invention is applicable to display control relating to other failures. Further, the present invention is applicable to apparatuses other than the temperature controller. Further, the present invention can be modified to allow change of manners of presenting an abnormality display, for example according to change of combinations of transmission and non-transmission of an abnormality signal (abnormality detection signal or event information signal) and a latch signal. Such modification can be achieved only by arranging such that combinations of transmission and non-transmission of an abnormality signal and a latch signal, and manners of presenting an abnormality display for the respective combinations can be set from the outside. The present invention can be modified in other various ways without departing from the spirit and scope thereof.

What is claimed is:

1. A monitoring system comprising;
a display device;
an abnormality detection device monitoring an object and when detecting an abnormality of the monitored object, outputting an abnormality signal;
a display control device causing the display device to present an abnormality display;
a latch device retaining the output state resulting from receipt of an abnormality signal, thereby continuing to output a latch signal until reset; and
a reset device resetting the latch device, wherein the display control device determines in what manner the display device presents an abnormality display, depending on whether an abnormality signal and a latch signal are each transmitted or not.

2. The monitoring system according to claim 1, wherein the display control device causes the display device to present an abnormality display in the manner that varies depending on whether an abnormality signal is transmitted, or an abnormality signal is not transmitted but a latch signal is transmitted.

3. The monitoring system according to claim 1, further comprising a setting device setting, in advance, the manner in which the display device presents an abnormality display, for each of combinations of transmission and non-transmission of abnormality and latch signals.

4. The monitoring system according to claim 1, further comprising a check device checking the output state of the latch device in response to an instruction supplied from the outside, wherein the display control device causes the display device to present an abnormality display on the condition that the check device receives an instruction.

5. The monitoring system according to claim 1, wherein the abnormality detection device monitors a temperature sensor, and when detecting a transmission-line failure in the temperature sensor, outputs an abnormality signal.

6. A temperature controller comprising:
a monitoring system;
a temperature sensor; and
a temperature control device,
wherein said monitoring system includes:
a display device
an abnormality detection device monitoring the temperature sensor and when detecting an abnormality of the temperature sensor, outputting an abnormality signal; and
a display control device causing the display device to present an abnormality display,
wherein said temperature control device configured to control temperature of an object on the basis of a temperature signal transmitted from the temperature sensor, wherein the monitoring device further comprises:
a latch device for retaining the output state resulting from receipt of an abnormality signal, thereby continuing to output a latch signal until reset; and
a reset device resetting the latch device, and the display control device determines in what manner the display device presents an abnormality display, depending on whether an abnormality signal and a latch signal are each transmitted or not.

* * * * *